United States Patent
Song et al.

(10) Patent No.: US 9,630,388 B2
(45) Date of Patent: Apr. 25, 2017

(54) COMPOSITE FLOOR AND MANUFACTURING METHOD THEREOF

(71) Applicant: Zhejiang Yongyu Bamboo Joint-Stock Co., Ltd., Huzhou (CN)

(72) Inventors: Jiangang Song, Huzhou (CN); Yongxing Chen, Huzhou (CN); Jun Xu, Huzhou (CN); Weiqiang Fu, Huzhou (CN)

(73) Assignee: Zhejiang Yongyu Bamboo Joint-Stock Co., Ltd., Huzhou (CN)

( * ) Notice: Subject to any disclaimer, the term of this patent is extended or adjusted under 35 U.S.C. 154(b) by 369 days.

(21) Appl. No.: 14/320,680

(22) Filed: Jul. 1, 2014

(65) Prior Publication Data

US 2016/0001527 A1 Jan. 7, 2016

(51) Int. Cl.
| | |
|---|---|
| *B32B 27/22* | (2006.01) |
| *B32B 38/00* | (2006.01) |
| *B32B 27/40* | (2006.01) |
| *B29C 47/88* | (2006.01) |
| *B32B 7/12* | (2006.01) |
| *B32B 27/06* | (2006.01) |
| *B32B 27/30* | (2006.01) |
| *B32B 27/32* | (2006.01) |
| *B32B 37/16* | (2006.01) |
| *B29C 47/92* | (2006.01) |
| *B29C 44/50* | (2006.01) |
| *B29C 44/56* | (2006.01) |
| *B29C 47/00* | (2006.01) |
| *B29L 31/00* | (2006.01) |
| *B29L 9/00* | (2006.01) |
| *B29K 427/06* | (2006.01) |
| *B29K 511/14* | (2006.01) |

(52) U.S. Cl.
CPC ............ *B32B 38/004* (2013.01); *B29C 44/50* (2013.01); *B29C 44/569* (2013.01); *B29C 47/0019* (2013.01); *B29C 47/0042* (2013.01); *B29C 47/884* (2013.01); *B29C 47/92* (2013.01); *B32B 7/12* (2013.01); *B32B 27/065* (2013.01); *B32B 27/22* (2013.01); *B32B 27/304* (2013.01); *B32B 27/32* (2013.01); *B32B 27/40* (2013.01); *B32B 37/16* (2013.01); *B29C 47/0004* (2013.01); *B29C 2947/9258* (2013.01); *B29C 2947/9259* (2013.01); *B29C 2947/92514* (2013.01); *B29K 2223/083* (2013.01); *B29K 2427/06* (2013.01); *B29K 2511/14* (2013.01); *B29L 2009/00* (2013.01); *B29L 2031/732* (2013.01); *B32B 2038/0016* (2013.01); *B32B 2250/02* (2013.01); *B32B 2262/06* (2013.01); *B32B 2264/067* (2013.01); *B32B 2307/402* (2013.01); *B32B 2307/51* (2013.01); *B32B 2317/16* (2013.01); *B32B 2419/04* (2013.01)

(58) Field of Classification Search
CPC .. B29C 2947/92514; B29C 2947/9258; B29C 2947/9259; B29C 44/50; B29C 44/569; B29C 47/0004; B29C 47/0019; B29C 47/0042; B29C 47/884; B29C 47/92; B29K 2223/083; B29K 2427/06; B29K 2511/14; B32B 2038/0016; B32B 2250/02; B32B 2262/06; B32B 2264/067; B32B 2307/402; B32B 2307/51; B32B 2317/16; B32B 2419/04; B32B 27/065; B32B 27/22; B32B 27/304; B32B 27/32; B32B 27/40; B32B 37/16
USPC .................................................. 428/212, 220
See application file for complete search history.

(56) References Cited

PUBLICATIONS

Wang (CN 201900761U), Jul. 20, 2011.*

* cited by examiner

*Primary Examiner* — Aaron Austin
*Assistant Examiner* — Lawrence Ferguson
(74) *Attorney, Agent, or Firm* — NK Patent Law, PLLC

(57) ABSTRACT

A composite flooring and a manufacturing method thereof are disclosed. The composite floor includes, at least, a bamboo-plate surface layer and an organic layer.

6 Claims, No Drawings

COMPOSITE FLOOR AND MANUFACTURING METHOD THEREOF

TECHNICAL FIELD

The present invention relates to a floor and a manufacturing method thereof, in particular a composite floor and a manufacturing method thereof.

BACKGROUND OF THE INVENTION

As the global economy develops, numerous forests are being chopped down, leading to the deterioration of the environment. The environment in which human beings live has seen destruction like never before. Ecological environmental protection has become the common pursuit of human beings in the new century. The use of bamboo or wood flooring obviously wastes a large amount of natural wood resources. In addition, a lot of adhesives containing formaldehyde are used during preparation, and the formaldehyde remains in the room even after a long period time. Therefore, composite floor has become gradually more accepted. However, composite floor that is purely made from artificial materials is usually of poor quality and is inconvenient to use.

Bamboo plastic floor that imitates solid wood preserves its beautiful bamboo textures and the features of heat insulation, isolation, waterproofing, mothproofing, fire retardancy, and resistance to acids, bases and decay, and also has the following features that wood does not have: (1) Rich colors, varieties of textures: Wood plastic products that imitate solid wood are computer-designed, can generate the color and textures of natural wood, have brighter luster, more solid textures, and dynamic and vivid patterns, and fully satisfy people's demands for variety and individualization. (2) Leading the trend of "green products, green customization": No adhesives are used over the course of the entire manufacturing process for creating bamboo plastic floor that imitates solid wood, and so harmful substances such as formaldehyde are not present. Customers can thus use those products at ease. (3) Superior product performance: Bamboo plastic floor that imitates solid wood is used for outdoor decorations and does not easily deform, arch, crack, shrink and decay. (4) High product utilization rate: Bamboo plastic floor that imitates solid wood has no inherent defects like natural wood, such as wormholes, knots, and color changes. It is a decorative material having almost no defects. This material has textures and luster in a certain regular manner, and is good-looking and durable. (5) High product recycling rate: bamboo plastic floor that imitates solid wood can be repeatedly recycled a number of times due to its ability to biodegrade. In conclusion, bamboo plastic products that imitate solid wood are optimal substitutes for natural wood resources that have gradually been diminished.

The Chinese patent CN102304244B(2012-9-12) details a bamboo plastic plate for indoor decoration, wherein PE, PP, PS or ABS plastics serving as main materials are mixed and stirred with tourmaline mine powder, bamboo carbon charcoal, bamboo fiber, adhesive, lubricant and coupling agent in a stirrer, then cast and molded into bamboo plastic plates. However, this bamboo plastic plate is a single-layer structure that has a single function, poor quality, poor elasticity underfoot, and its resistance to deformation needs improvement.

BRIEF SUMMARY OF THE INVENTION

One objective of the present invention is to provide firmly constructed and deformation-resistant composite floor that is formed by combining a bamboo-plate surface layer with an organic layer.

The objective of the present invention is to provide a manufacturing method for the firmly constructed and deformation-resistant composite floor.

The present invention provides the following technical solution to fulfill the first technical objective:

The composite floor includes, at least, a bamboo-plate surface layer and an organic layer.

The organic layer of the present invention is made from local waste powder such as bamboo powder or wood powder through modification. It is environmentally-friendly and economical, and does not deform because of environmental humidity or moisture. The composite floor formed by combining the organic layer and the bamboo-plate surface layer is an effective substitute for antiseptic and solid bamboo and wood, and has higher strength and elasticity and more comfortable feel underfoot than the antiseptic and solid bamboo and wood. The composite floor is damp-proof, fireproof, and resistant to decay, deformation and warping, is firmly constructed, and is of high quality.

Preferably, a soft wood or fireproof plate bottom player is arranged below the organic layer; the soft wood layer is a sawdust laminated layer or a soft wood EVA foaming material layer; the bamboo-plate surface layer is 1 to 3 mm thick and has a moisture rate of 5 to 15%; and the organic layer is 4 to 10 mm thick.

The organic layer with a certain thickness is used as the core layer combined with the bamboo-plate surface layer having a specific thickness and moisture rate and the bottom layer to form the composite floor. The arrangement of the soft wood layer further increases the good elasticity underfoot. The composite floor is an effective substitute for antiseptic and solid bamboo and wood, and has higher strength and elasticity and is more comfortable underfoot than antiseptic and solid bamboo and wood. The composite floor is damp-proof, fireproof, and resistant to decay, deformation and warping, is firmly constructed, and is of high quality Preferably, the organic layer is a bamboo plastic layer. The bamboo plastic layer comprises the following components by weight:

100 parts of polyvinyl chloride,
30 to 50 parts of silane coupling agent modified bamboo powder,
30 to 50 parts of calcium carbonate,
5 to 7 parts of sterilizer,
10 to 16 parts of foam regulator,
0.8 to 1.6 parts of foaming agent,
2 to 4 parts of chlorinated polyethylene,
3 to 5 parts of lubricant,
1 to 3 parts of plasticizer, and
0.2 to 0.6 part of anti-aging agent.

The present invention is based on local circumstances. The local excessive waste bamboo powder is collected and modified in a specific component ratio to obtain the organic layer with high strength, good elasticity underfoot and high resistance to deformation.

Preferably, the stabilizer is calcium stearate; the foaming agent is azodicarbonamide; the plasticizer is dimethyl phthalate, diethyl phthalate or di-n-octyl phthalate.

The bamboo plastic layer made by mixing this type of additive and the silane coupling agent modified bamboo powder is of high strength, has a good feeling of elasticity underfoot, and has a resistance to deformation.

More preferably, the foam regulator is an acrylic foam regulator; the lubricant is a fatty acid type mixer; and the anti-aging agent is a quinine type radical scavenger.

Preferably, an adhesive layer is arranged between the bamboo-plate surface layer and the organic layer; and the surface of the bamboo-plate surface layer is provided with a bamboo plastic layer having a seal coat.

The bamboo-plate surface layer with the seal coat has vivid textures and high plumpness, and does not exchange water with the surrounding environment. In addition, the bamboo plastic layer itself does not absorb moisture, so the entire floor is isolated from the moisture in the surrounding environment and is not affected by the environmental humidity. Therefore, the composite floor with high resistance to deformation and a good feeling of elasticity underfoot is obtained.

Preferably, the adhesive layer is a polyurethane glue layer.

Preferably, the glue consists of the following raw materials by weight:

70 to 95 parts of polyurethane, 25 to 35 parts of phthalic anhydride, 10 to 12 parts of triethylene glycol, 15 to 18 parts of glutaric acid, 8 to 10 parts of butanetriol, 5 to 7 parts of zinc oxide, 3 to 5 parts of magnesium oxide, 15 to 25 parts of chloroprene rubber, 2 to 3 parts of softening oil; 15 to 20 parts of dimethyl carbonate, 20 to 30 parts of ethylbenzene and 1 to 3 parts of fire retardant; the fire retardant consist of the following components by weight part: 20 to 50 parts of ammonium oligomericphosphate, 10 to 25 parts of ammonium phosphate, 6 to 12 parts of ammonium pyrophosphate, 5 to 20 parts of ammonium sulfate, 5 to 10 parts of boric acid and 10 to 25 parts of water.

The glue of the present invention has the advantages of high initial adhesion and fastness; the fire retardant of the present invention has high fire retardancy and can carry out synergistic interaction with other ingredients in the glue to increase the initial adhesion of the glue.

The present invention provides the following technical solution to fulfill the second technical objective:

A manufacturing method for the compound floor, comprising:

A. preparing the bamboo-plate surface layer: sanding the bamboo plate surface smooth to form the bamboo plate surface layer;

B. preparing the organic layer by the following steps:

(1) modification: stirring and uniformly mixing organic powder with a particle size of 60 to 120 m and silane coupling agent which accounts for 1.1 to 1.3% of the organic powder by weight at a temperature of 100 to 130 degrees C., then cooling to 5 to 45 degrees C. to obtain modified organic powder;

(2) materials mixing by weight ratio: stiffing and mixing 100 parts of polyvinyl chloride, 30 to 50 parts of calcium carbonate, 5 to 7 parts of sterilizer, 10 to 16 parts of foam regulator, 0.8 to 1.6 parts of foaming agent, 2 to 4 parts of chlorinated polyethylene, 3 to 5 parts of lubricant, 1 to 3 parts of plasticizer, 0.2 to 0.6 part of anti-aging agent and 30 to 50 parts of silane coupling agent modified organic powder at a temperature of 110 to 130 degrees C. for 20 to 30 minutes to obtain a mixed material, wherein the stirring speed is 600 to 1,000 revolutions per minute;

(3) extrusion molding: feeding the mixed material into the barrel of a main conical double-screw extruder, and starting the extruder to extrude and mold an organic material with a density of 600 to 1,200 kg/cm$^3$;

(4) post processing: water cooling, drawing and cutting the molded organic material to obtain the organic plate substrate;

C. combination: hot pressing or gluing the bamboo-plate surface layer and the organic layer and then cold pressing the layers to generated the composite floor.

The modified organic powder has high processability, can effectively react with the additive and foam to generate the organic layer with a high degree of strength and certain elasticity.

The present invention is based on the local circumstances. The local excessive waste bamboo powder is collected and modified in a specific component ratio to obtain the organic layer with a high degree of strength, good elasticity underfoot and a high resistance to deformation. The composite floor is of high quality and is firmly constructed.

Preferably, the organic layer is a bamboo plastic layer, and the organic powder is bamboo powder; in step (1), the bamboo powder with a particle size of 60 to 120 m and the silane coupling agent which accounts for 1.1 to 1.3% of the bamboo powder by weight are uniformly mixed and stirred at a speed of 1,000 to 1,300 revolutions per minute for 5 to 8 min at temperature of 100 to 130 degrees C., then kept at this temperature for 2 to 4 min, next cooled to 5 to 45 degrees C. to obtain the modified bamboo powder.

The modified bamboo powder has high processability and can effectively react with the additive and foam to generate the bamboo plastic layer with a high degree of strength and certain elasticity.

Preferably, in step (2), mixing in a ratio refers to stirring and mixing 10 to 16 parts of foam regulator, 0.8 to 1.6 parts of foaming agent, 3 to 5 parts of lubricant, 1 to 3 parts of plasticizer, 0.2 to 0.6 part of anti-aging agent and the modified bamboo powder obtained in step (1) for 15 to 20 min in a stiffing mixer, then adding 100 parts of polyvinyl chloride, 30 to 50 parts of calcium carbonate, 5 to 7 parts of sterilizer and 2 to 4 parts of chlorinated polyethylene into the stiffing mixer, next continuously stiffing and mixing at a speed of 600 to 1,000 revolutions per minute for 5 to 10 minutes to obtain the mixed material.

Different feeding sequences and material mixing ratios are employed in the present invention, which can prevent migration of the polyvinyl chloride, chlorinated polyethylene and sterilizer, allows for the formation of a quality mixed material and is good for the subsequent extrusion molding process.

Preferably, in step (3), the main extruder for extrusion and molding has a temperature of 130 to 170 degrees C., a rotation speed of 40 to 50 revolutions per minute and an extrusion speed of 600 mm/minute; the melt pressure of the extruder is 3 to 8 Mpa; the rotation speed of the feeding machine is 4 to 6 revolutions per minute; and the temperature of the machine head is 160 to 170 degrees C.

The inventor found that the bamboo plastic plate substrates made from the bamboo plastic materials extruded and molded by the main extruder and the feeding machine which are matched in parameters have a high degree of strength, good elasticity underfoot and a high resistance to deformation.

Preferably, the bottom surface of the bamboo-plate surface layer is sanded with a sanding belt to form a smooth surface and then cold pressed to the bamboo plastic layer using polyurethane glue at a temperature of 5 to 60 degrees C. under a pressure of 1 to 3 MPa/cm$^2$.

The bamboo-plate surface layer and the bamboo plastic layer laminated at this temperature under this pressure are firmly constructed and have high resistance to deformation.

The glue is polyurethane type cold pressing glue. The bamboo plastic substrate does not release formaldehyde; the bamboo plate paint is sealed and releases little formaldehyde; the formaldehyde emission of the bamboo-bamboo plastic floor reaches level $E_0$.

Preferably, the bamboo-plate surface layer acts as a surface layer, the organic layer acts as a core layer and the EVA, soft wood or fireproof plate layer acts as the bottom layer, and the three are hot pressed or glued and then cold pressed to generate the composite floor.

Preferably, the manufacturing method also comprises manufacturing a seal coat on the surface of the bamboo-plate surface layer by steps of: coloring the surface of the bamboo-plate surface layer first, then heating the floor to 30 to 38 degrees C., next spraying a primer to the colored surface of the bamboo-plate surface layer, and finally applying varnish on the primer surface after the primer has dried.

The bamboo-plate surface layer with the seal coat has vivid textures and high plumpness, and does not exchange water with the surrounding environment. In addition, the bamboo plastic layer itself does not absorb moisture, so the entire floor is isolated from the moisture in the surrounding environment and is not affected by the environmental humidity.

In conclusion, the bamboo plastic composite floor of the present invention has the following beneficial effects:
1. Resistance to humidity, fire and decay;
2. Resistance to bending and wrapping and firm adhesion.

DETAILED DESCRIPTION OF THE INVENTION

Embodiment 1

The composite floor is a bamboo plastic composite floor, at least including a bamboo-plate surface layer, a bamboo plastic layer and an adhesive layer located between the bamboo-plate surface layer and the bamboo plastic layer.

Manufacturing Method of the Bamboo Plastic Layer:

(1) modification: bamboo powder with a particle size of 60 to 120 m and silane coupling agent which accounts for 1.1% of the organic powder by weight are uniformly mixed and stirred at a temperature of 100 degrees C., then cooled to 5 degrees C. to obtain modified bamboo powder (2) material mixing in a weight ratio: 100 parts of polyvinyl chloride, 30 parts of calcium carbonate, 5 parts of sterilizer, 10 parts of foam regulator, 0.8 part of foaming agent, 2 parts of chlorinated polyethylene, 3 parts of lubricant, 1 part of plasticizer, 0.2 part of anti-aging agent and 30 to 50 parts of silane coupling agent modified organic powder are mixed and stirred at a speed of 600 revolutions per minute for 20 min at a temperature of 110 degrees C. to obtain a mixed material, wherein the sterilizer is calcium stearate; the foaming agent is azodicarbonamide; the plasticizer is dimethyl phthalate, diethyl phthalate or di-n-octyl phthalate; the foam regulator is an acrylic foam regulator; the lubricant is a fatty acid type mixer; and the anti-aging agent is a quinine type radical scavenger.

(3) extrusion molding: the mixed material is fed into the barrel of a main conical double-screw extruder, and the extruder is started at the same time to extrude and mold a bamboo plastic material with a density of 600 to 800 kg/cm$^3$, wherein the main extruder for extrusion and molding has a temperature of 130 degrees C., a rotation speed of 40 revolutions per minute and an extrusion speed of 600 mm/min; the melt pressure of the extruder is 3 Mpa; the rotation speed of the feeding machine is 4 revolutions per minute; and the temperature of the machine head is 160 degrees C.;

(4) post processing: the molded bamboo plastic material water cooled, drawn and cut to obtain the bamboo plastic plate substrate.

Manufacturing method of the bamboo-plate surface layer: the bottom surface of the bamboo-plate surface layer is sanded with a 120 to 150 m sanding belt to be smooth.

Preparation of the Polyurethane Glue: the Following Components are Mixed by Weight:

70 parts of polyurethane, 25 parts of phthalic anhydride, 10 parts of triethylene glycol, 15 parts of glutaric acid, 8 parts of butanetriol, 5 parts of zinc oxide, 3 parts of magnesium oxide, 15 parts of chloroprene rubber, 2 parts of softening oil; 15 parts of dimethyl carbonate, 20 parts of ethylbenzene and 3 parts of fire retardant; the fire retardant consist of the following components by weight: 20 parts of ammonium oligomericphosphate, 10 parts of ammonium phosphate, 6 parts of ammonium pyrophosphate, 5 parts of ammonium sulfate, 10 parts of boric acid and 25 parts of water.

Manufacturing of the composite floor: the sanded bamboo-plate surface layer is cold pressed to the bamboo plastic layer using the polyurethane glue at a temperature of 5 degrees C. under a pressure of 1 MPa/cm$^2$. Finally, manufacturing of the seal coat on the surface of the bamboo-plate surface layer: the surface of the bamboo-plate surface layer is colored first; then the floor is heated to 30 degrees C., next a primer is sprayed to the colored surface of the bamboo-plate surface layer; and finally, a varnish is applied onto the primer surface after the primer has dried. The bamboo-plate surface layer of the finally obtained composite floor is 2 mm thick and has a moisture rating of 10%, and the bamboo plastic layer is 7 mm thick.

Embodiment 2

The composite floor is a bamboo plastic composite floor, at least including a bamboo-plate surface layer, a bamboo plastic layer and an adhesive layer located between the bamboo-plate surface layer and the bamboo plastic layer.

Manufacturing Method of the Bamboo Plastic Layer:

(1) modification: the bamboo powder with a particle size of 60 to 120 m and silane coupling agent which accounts for 1.3% of the organic powder by weight are uniformly mixed and stirred at a temperature of 130 degrees C., then cooled to 45 degrees C. to obtain modified bamboo powder;

(2) material mixing in a weight ratio:100 parts of polyvinyl chloride, 50 parts of calcium carbonate, 7 parts of sterilizer, 16 parts of foam regulator, 1.6 parts of foaming agent, 4 parts of chlorinated polyethylene, 5 parts of lubricant, 3 parts of plasticizer, 0.6 part of anti-aging agent and 30 to 50 parts of silane coupling agent modified organic powder are mixed and stirred at a temperature of 130 degrees C. for 30 min to obtain a mixed material, wherein the stirring speed is 1,000 revolutions per minute;

(3) extrusion molding: the mixed material is fed into the barrel of a main conical double-screw extruder, and the extruder is started at the same time to extrude and mold a bamboo plastic material with a density of 1,200 kg/cm3, wherein the main extruder for extrusion and molding has a temperature of 170 degrees C., a rotation speed of 50 revolutions per minute and an extrusion speed of 600 mm/min; the melt pressure of the extruder is 8 Mpa; the rotation speed of the feeding machine is 6 revolutions per minute; and the temperature of the machine head is 170 degrees C.;

(4) post processing: the molded organic material is water cooled, drawn and cut to obtain the organic plate substrate.

Manufacturing method of the bamboo-plate surface layer: the bottom surface of the bamboo-plate surface layer is sanded with a 120 to 150 m sanding belt to be smooth.

Preparation of the Polyurethane Glue: the Following Components are Mixed by Weight:

80 parts of polyurethane, 35 parts of phthalic anhydride, 12 parts of triethylene glycol, 18 parts of glutaric acid, 10 parts of butanetriol, 7 parts of zinc oxide, 5 parts of magnesium oxide, 25 parts of chloroprene rubber, 3 parts of softening oil; 20 parts of dimethyl carbonate, 30 parts of ethylbenzene and 1 part of fire retardant; the fire retardant consist of the following components by weight: 50 parts of ammonium oligomericphosphate, 25 parts of ammonium phosphate, 12 parts of ammonium pyrophosphate, 20 parts of ammonium sulfate, 5 parts of boric acid and 10 parts of water.

Manufacturing of the composite floor: the sanded bamboo-plate surface layer is cold pressed to the bamboo plastic layer using polyurethane glue at a temperature of 60 degrees C. under a pressure of 3 MPa/cm$^2$. Finally, manufacturing of the seal coat on the surface of the bamboo-plate surface layer: the surface of the bamboo-plate surface layer is colored first; then the floor is heated to 38 degrees C., next a primer is sprayed to the colored surface of the bamboo-plate surface layer; and finally, a varnish is applied onto the primer surface after the primer has dried. The bamboo-plate surface layer of the finally obtained composite floor is 1 mm thick and has a moisture rate of 5%, and the bamboo plastic layer is 4 mm thick.

Embodiment 3

The composite floor is a bamboo plastic composite floor, at least including a bamboo-plate surface layer, a bamboo plastic layer and an adhesive layer located between the bamboo-plate surface layer and the bamboo plastic layer.

Manufacturing Method of the Bamboo Plastic Layer:

(1) modification: the bamboo powder with a particle size of 60 to 120 m and silane coupling agent which accounts for 1.2% of the organic powder by weight are uniformly mixed and stirred at a temperature of 120 degrees C., then cooled to 25 degrees C. to obtain modified bamboo powder;

(2) material mixing in a weight ratio: 100 parts of polyvinyl chloride, 40 parts of calcium carbonate, 6 parts of sterilizer, 12 parts of foam regulator, 1.2 parts of foaming agent, 3 parts of chlorinated polyethylene, 4 parts of lubricant, 2 parts of plasticizer, 0.4 part of anti-aging agent and 30 to 50 parts of silane coupling agent modified organic powder are mixed and stirred at a temperature of 120 degrees C. for 26 min to obtain a mixed material, wherein the stirring speed is 800 revolutions per minute;

(3) extrusion molding: the mixed material is fed into the barrel of a main conical double-screw extruder, and the extruder is started at the same time to extrude and mold a bamboo plastic material with a density of 800 to 1,000 kg/cm$^3$, wherein the main extruder for extrusion and molding has a temperature of 150 degrees C., a rotation speed of 45 revolutions per minute and an extrusion speed of 800 mm/min; the melt pressure of the extruder is 5 Mpa; the rotation speed of the feeding machine is 5 revolutions per minute; and the temperature of the machine head is 165 degrees C.;

(4) post processing: the molded organic material is water cooled, drawn and cut to obtain the organic plate substrate.

Manufacturing method of the bamboo-plate surface layer: the bottom surface of the bamboo-plate surface layer is sanded with a 120 to 150 m sanding belt to be smooth.

Preparation of the Polyurethane Glue: the Following Components are Mixed by Weight Part:

95 parts of polyurethane, 29 parts of phthalic anhydride, 11 parts of triethylene glycol, 16 parts of glutaric acid, 9 parts of butanetriol, 6 parts of zinc oxide, 4 parts of magnesium oxide, 21 parts of chloroprene rubber, 2.5 parts of softening oil; 18 parts of dimethyl carbonate, 26 parts of ethylbenzene and 2 parts of fire retardant; the fire retardant consist of the following components by weight: 30 parts of ammonium oligomericphosphate, 18 parts of ammonium phosphate, 9 parts of ammonium pyrophosphate, 15 parts of ammonium sulfate, 8 parts of boric acid and 18 parts of water.

Manufacturing of the composite floor: the sanded bamboo-plate surface layer is cold pressed to the bamboo plastic layer using the polyurethane glue at a temperature of 30 degrees C. under a pressure of 2 MPa/cm$^2$. Finally, the manufacturing of the seal coat on the surface of the bamboo-plate surface layer: the surface of the bamboo-plate surface layer is colored first; then the floor is heated to 35 degrees C., next a primer is sprayed to the colored surface of the bamboo-plate surface layer; and finally, a varnish is applied to on the primer surface after the primer has dried. The bamboo-plate surface layer of the finally obtained composite floor is 3 mm thick and has a moisture rating of 15%, and the bamboo plastic layer is 10 mm thick.

Embodiment 4

Similar to embodiment 1, different in that the composite floor is a wood plastic composite floor Embodiment 5

Similar to embodiment 2, different in that the composite floor is a wood plastic composite floor Embodiment 6

Similar to embodiment 1, different in that the composite floor is a wood plastic composite floor Embodiment 7

Similar to embodiment 1, different in that: in step (1), the organic powder with a particle size of 60 to 120 m and the silane coupling agent which accounts for 1.1% of the organic powder by weight are uniformly mixed and stirred at a speed of 1,000 revolutions per minute for 5 min at temperature of 100 degrees C., then kept at this temperature for 2 min, next cooled to 5 degrees C. to obtain the modified organic powder.

In step (2), materials mixing comprises stirring and mixing the foam regulator, the foaming agent, the lubricant, the plasticizer, the anti-aging agent and the modified organic powder obtained in step (1) in a stirring mixer at a temperature of 110 degrees C. for 15 min, then adding the polyvinyl chloride, calcium carbonate, sterilizer and chlorinated polyethylene into the stirring mixer, continuously mixing and stirring for 5 min to obtain the mixed material, wherein the stirring speed is 600 revolutions per minute.

In order to manufacture the composite floor, the bamboo-plate surface layer serving as the surface layer, the bamboo plastic organic layer serving as the core layer and the fireproof plate layer serving as the bottom layer are glued and cold pressed to form the composite floor.

Embodiment 8

Similar to embodiment 2, different in that: in step (1), the organic powder with a particle size of 60 to 120 m and the silane coupling agent which accounts for 1.3% of the organic powder by weight are uniformly mixed and stirred at a speed of 1,300 revolutions per minute for 8 min at temperature of 130 degrees C., then kept at this temperature for 4 min, next cooled to 45 degrees C. to obtain the modified organic powder.

In step (2), material mixing comprises stirring and mixing the foam regulator, the foaming agent, 3 to 5 parts of the lubricant, the plasticizer, the anti-aging agent and the modified organic powder obtained in step (1) in a stirring mixer at a temperature of 130 degrees C. for 20 min, then adding the polyvinyl chloride, calcium carbonate, sterilizer and chlorinated polyethylene into the stirring mixer, continuously mixing and stirring for 10 min to obtain the mixed material, wherein the stirring speed is 1,000 revolutions per minute.

When manufacturing the composite floor, the bamboo-plate surface layer serving as the surface layer, the bamboo plastic organic layer serving as the core layer and the EVA bottom layer are hot pressed to form the composite floor.

Embodiment 9

Similar to embodiment 3, different in that: in step (1), the organic powder with a particle size of 60 to 120 m and the silane coupling agent which accounts for 1.2% of the organic powder by weight are uniformly mixed and stirred at a speed of 1,200 revolutions per minute for 6 min at temperature of 120 degrees C., then kept at this temperature for 3 min, next cooled to 35 degrees C. to obtain the modified organic powder.

In step (2), material mixing comprises stirring and mixing the foam regulator, the foaming agent, 3 to 5 parts of the lubricant, the plasticizer, the anti-aging agent and the modified organic powder obtained in step (1) in a stirring mixer at a temperature of 110 to 130 degrees C. for 18 min, then adding the polyvinyl chloride, calcium carbonate, sterilizer and chlorinated polyethylene into the stirring mixer, continuously mixing and stirring for 8 min to obtain the mixed material, wherein the stirring speed is 800 revolutions per minute.

When manufacturing the composite floor, the bamboo-plate surface layer serving as the surface layer, the bamboo plastic organic layer serving as the core layer and the sawdust soft wood bottom layer are glued and cold pressed into the composite floor.

Comparative Embodiment 1

Similar to embodiment 1, different in that the bamboo powder is not modified by the silane coupling agent, and the bamboo plastic layer does not include calcium carbonate and chlorinated polyethylene.

Comparative Embodiment 2

Similar to embodiment 2, different in that the bamboo powder is not modified by the silane coupling agent. To manufacture the composite floor, the bottom surface of the bamboo surface layer is sanded with the sanding belt to be smooth and then cold pressed to the bamboo plastic layer using polyurethane glue at a temperature of 70 degrees C. under a pressure of 4 MPa/cm$^2$.

According to the evaluation standard GB/T18103-2003, the standard value of static bending intensity is more than or equal to 300 MPa; the elasticity modulus is more than or equal to 4,000 MPa; the formaldehyde emission $E_0$ is less than or equal to 0.5 Mg/L.

Embodiments and comparative embodiment detection results of the present invention are as follows:

| Item | Static bending intensity | Elasticity modulus MPa | Formaldehyde emission Mg/L | Soaked in water |
|---|---|---|---|---|
| Embodiment 1 | 50 | 8640 | 0.2 | Soaked for 85 days, no expansion, no deformation |
| Embodiment 2 | 54 | 8750 | 0.2 | Soaked for 85 days, no expansion, no deformation |
| Embodiment 3 | 58 | 8910 | 0.2 | Soaked for 85 days, no expansion, no deformation |
| Embodiment 4 | 52 | 8440 | 0.1 | Soaked for 95 days, no expansion, no deformation |
| Embodiment 5 | 51 | 8370 | 0.1 | Soaked for 95 days, no expansion, no deformation |
| Embodiment 6 | 53 | 8438 | 0.1 | Soaked for 95 days, no expansion, no deformation |
| Embodiment 7 | 62 | 8960 | 0.1 | Soaked for 95 days, no expansion, no deformation |
| Embodiment 8 | 64 | 8980 | 0.1 | Soaked for 95 days, no expansion, no deformation |
| Embodiment 9 | 66 | 9018 | 0.1 | Soaked for 95 days, no expansion, no deformation |
| Comparative Embodiment 1 | 36 | 7000 | 0.3 | Soaked for 60 days, no expansion, no deformation |
| Comparative Embodiment 2 | 38 | 7400 | 0.3 | Soaked for 65 days, no expansion, no deformation |

From the above table it can be seen that the bamboo-organic floor, in particular the bamboo-bamboo plastic and/or soft wood or fireproof button layer composite floor has formaldehyde emission of reaching level $E_0$, almost negligible, and has high static bending intensity and elasticity modulus. This means that the composite floor of the present invention is firmly constructed, resistant to bending, wrapping and deformation, damp-proof and antiseptic.

The specific embodiments are merely used to explain the present invention, and shall not be regarded as expressing the limits of the present invention. Those skilled in this field can make modifications without a creative step after reading this specification. All modifications which fall within the protective scope of claims of the present invention are protected by the Patent Law.

What is claimed is:

1. A composite floor, characterized at least comprising a bamboo-plate surface layer and an organic layer;
   the organic layer is a bamboo plastic layer, and the bamboo plastic layer comprises the following components by weight:
   100 parts of polyvinyl chloride,
   30 to 50 parts of silane coupling agent modified bamboo powder, 30 to 50 parts of calcium carbonate,
5 to 7 parts of sterilizer,
10 to 16 parts of foam regulator,
0.8 to 1.6 parts of foaming agent,
2 to 4 parts chlorinated polyethylene,
3 to 5 parts of lubricant,
1 to 3 parts of plasticizer, and
0.2 to 0.6 parts of anti-aging agent.

2. The composite floor according to claim 1, characterized in that a soft wood or fireproof plate bottom layer is arranged below the organic layer; the soft wood layer is a sawdust laminated layer or a soft wood EVA foaming material layer; the bamboo-plate surface layer is 1 to 3 mm thick and has a moisture rating of 5 to 15%; and the organic layer is 4 to 10 mm thick.

3. The composite floor according to claim 1, characterized in that the sterilizer is calcium stearate; the foaming agent is azodicarbonamide; the plasticizer is dimethyl phthalate, diethyl phthalate or di-n-octyl phthalate.

4. The composite floor according to claim 3, characterized in that an adhesive layer is arranged between the bamboo-plate surface layer and the organic layer; and the surface of the bamboo-plate surface layer is provided with a bamboo plastic layer having a seal coat.

5. The composite floor according to claim 4, characterized in that the adhesive layer is a polyurethane glue layer.

6. The composite floor according to claim 5, characterized in that the glue consists of the following raw materials by weight:
70 to 95 parts of polyurethane,
25 to 35 parts of phthalic anhydride,
10 to 12 parts of triethylene glycol,
15 to 18 parts of glutaric acid,
8 to 10 parts of butanetriol,
5 to 7 parts of zinc oxide,
3 to 5 parts of magnesium oxide,
15 to 25 parts of chloroprene rubber,
2 to 3 parts of softening oil;
15 to 20 parts of dimethyl carbonate,
20 to 30parts of ethylbenzene and
1 to 3 parts of fire retardant; the fire retardant consist of the following components by weight part: 20 to 50 parts of ammonium oligomericphosphate, 10 to 25 parts of ammonium phosphate, 6 to 12 parts of ammonium pyrophosphate, 5 to 20 parts of ammonium sulfate, 5 to 10 parts of boric acid and 10 to 25 parts of water.

* * * * *